UNITED STATES PATENT OFFICE.

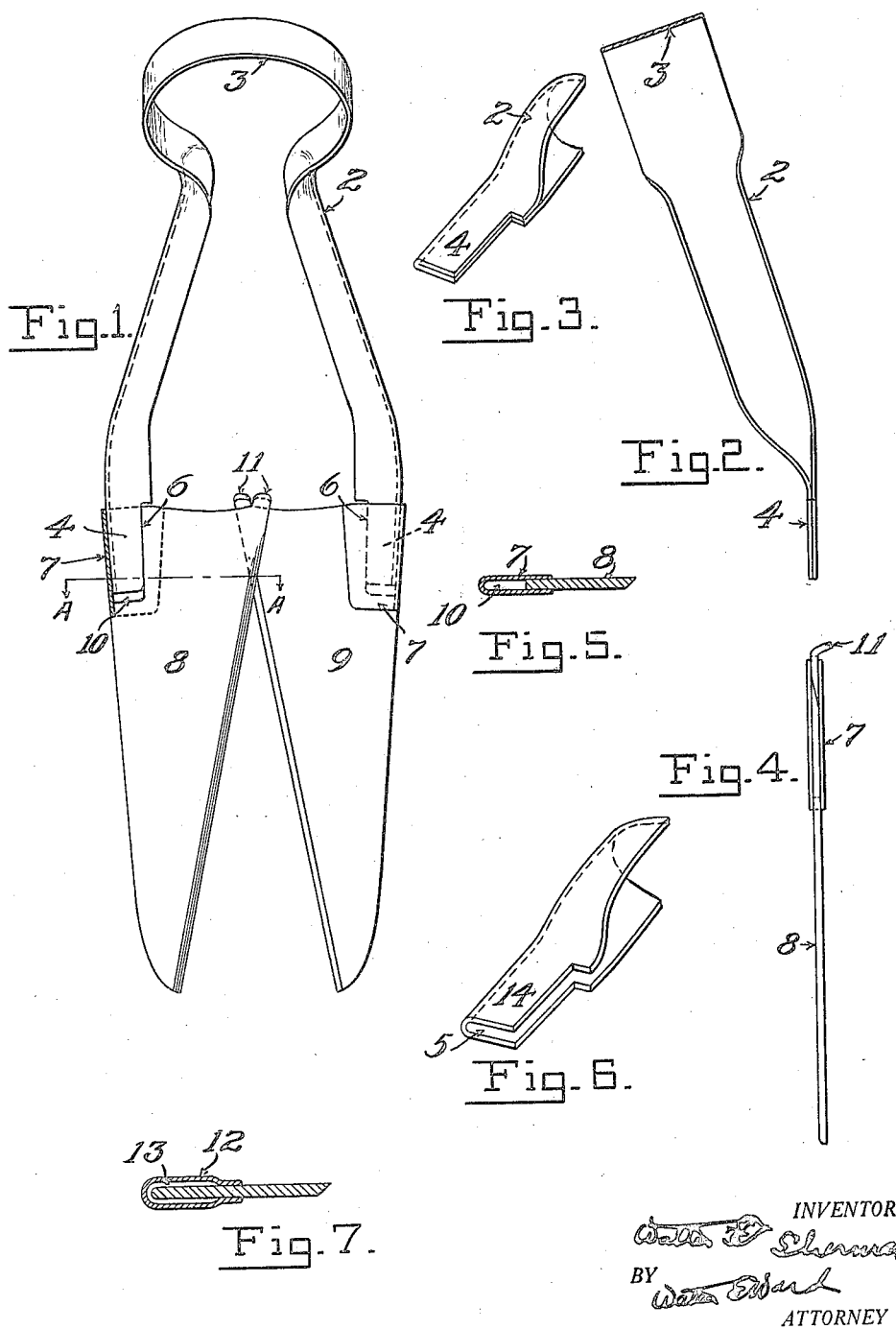

WALTER F. SHERMAN, OF ELSMERE, NEW YORK.

SHEARS.

1,425,061.   Specification of Letters Patent.   Patented Aug. 8, 1922.

Application filed March 8, 1920. Serial No. 364,327.

*To all whom it may concern:*

Be it known that I, WALTER F. SHERMAN, a citizen of the United States, residing at Elsmere, in the county of Albany and State of New York, have invented certain new and useful Improvements in Shears, of which the following is a specification.

My invention relates to spring shears, and the objects of my invention are to construct a shear of the type shown—the blades of which may be easily and quickly removed from the handle, for the purpose of sharpening or replacement, without the aid of tools; which will be of simple design and comparatively inexpensive to manufacture, together with such other elements and combinations as may be hereinafter described and subsequently claimed.

Users of such shears as are in question find that the sharpening of them is quite a problem. The shape of the shears, when the blades are formed integral with or are permanently fastened to the handles, being such that they are awkward to hold and it is nearly impossible to satisfactorily grind the cutting edges of the blades without special grinding apparatus. In case of a broken blade it is usually necessary to discard the whole shears.

To overcome these objections I have devised a shears the blades of which may be removed from or attached to the handle without the use of tools. What I now believe to be the preferred form of this shears is illustrated by Figs. 1 to 5, inclusive, of the drawings. I do not, however, wish to limit myself to this form, as a number of modifications may be made without departing from the spirit of my invention, one such modification being illustrated by Figs. 6 and 7 of the drawings.

In the drawings illustrating my invention.

Fig. 1 is a plan view of my improved shears, a part of the clip member of the blade being broken away.

Fig. 2 is an elevation of one-half of the handle, the inner side being shown.

Fig. 3 is a perspective view of one of the blade engaging ends of the handle.

Fig. 4 is a side elevation of one of the shear blades, looking toward the cutting edge.

Fig. 5 is a cross section (along the line A, A on Fig. 1) through the pocket end of a shear blade.

Fig. 6 is a perspective view of one of the blade engaging ends of a modified form of handle.

Fig. 7 is a cross section, through the pocket end of a modified form of shear blade.

The same numbers refer to the same parts throughout the several views.

Referring to the drawings, 2 is the U shaped handle of the shears, made of spring material and preferably having formed therein a spring loop 3. The blade engaging ends 4 being preferably made by flattening the handle ends as illustrated in Figs. 2 and 3 so that they are approximately the same thickness as the shear blades. These ends being preferably provided with a slight taper.

Fig. 6 shows a modification of this method of making the handle end, in which a space 5 is formed between the two sides of the handle end 14. The resultant U-shaped end being adapted to receive the corner of the shear blade.

I prefer to make the shear blade 8 and 9 substantially as shown in Figs. 1 and 4, making a notch 6 in the corner and covering the notch with a clip member 7 fastened in place in any suitable manner (as by welding) thus forming a pocket 10 adapted to closely engage the end 4 of the handle 2.

The blades 8 and 9 are preferably provided with projections 11, bent at substantially right angles thereto and adapted to engage one with the other so as to prevent the spring of the handle from drawing the blades out of contact with each other, (see Fig. 1).

In Fig. 7 I illustrate a modified form of handle engaging pocket, such as would be necessary with the modified form of handle end illustrated in Fig. 6.

In this form it is unnecessary to notch the shear blade to form the pocket for the handle end. The pocket being formed by changing the shape of the clip member as at 12, so as to form a U shaped pocket 13, adapted to receive the U shaped end 14 of the handle.

What I claim as new and desire to secure by Letters Patent is:

1. In a shears of the class described, a substantially U shaped handle the center thereof a spring, the ends thereof flattened to substantially the thickness of the shear blades and slightly wedge shaped; and shear blades notched at one corner and the notch covered by a clip fastened to the blade so as to form a sligthly tapered recess into which an end of the handle is adapted to fit.

2. In a shears of the class described, a substantially U shaped handle the center thereof a spring, the ends thereof flattened to substantially the thickness of the shear blades and slightly wedge shaped: shear shear blades notched at one corner and the notch covered by a clip fastened to the blade so as to form a slightly tapered recess into which an end of the handle is adapted to fit; and means for limiting the spring impelled motion of the blades.

In testimony whereof I have affixed my signature in the presence of two witnesses.

WALTER F. SHERMAN.

Witnesses:
 WALTER E. WARD,
 MINNIE MONTANYE.